(12) United States Patent
Ishino

(10) Patent No.: US 10,351,696 B2
(45) Date of Patent: Jul. 16, 2019

(54) RUBBER COMPOSITION FOR TIRE, AND PNEUMATIC TIRE

(71) Applicant: SUMITOMO RUBBER INDUSTRIES, LTD., Kobe-shi, Hyogo (JP)

(72) Inventor: Soh Ishino, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/153,638

(22) Filed: Jan. 13, 2014

(65) Prior Publication Data

US 2014/0213707 A1    Jul. 31, 2014

(30) Foreign Application Priority Data

Jan. 30, 2013   (JP) ................................. 2013-015866

(51) Int. Cl.
| | |
|---|---|
| *C08L 9/00* | (2006.01) |
| *B60C 1/00* | (2006.01) |
| *C08L 9/06* | (2006.01) |
| *C08K 5/548* | (2006.01) |
| *C08L 7/00* | (2006.01) |

(52) U.S. Cl.
CPC .................... *C08L 9/00* (2013.01); *B60C 1/00* (2013.01); *C08K 5/548* (2013.01); *C08L 7/00* (2013.01); *C08L 9/06* (2013.01)

(58) Field of Classification Search
CPC ..... C08L 9/00; C08L 9/06; C08L 7/00; C08K 5/548; B60C 1/00; Y02T 10/862
USPC ................................................... 524/186, 493
See application file for complete search history.

(56) References Cited

U.S. PATENT DOCUMENTS

| | | | |
|---|---|---|---|
| 6,407,153 B1 * | 6/2002 | von Hellens | C08J 3/226 524/188 |
| 2004/0181004 A1 * | 9/2004 | Sandstrom et al. | 524/492 |

* cited by examiner

*Primary Examiner* — Josephine L Chang
(74) *Attorney, Agent, or Firm* — Birch, Stewart, Kolasch & Birch, LLP

(57) ABSTRACT

Provided is a rubber composition for a tire having improved abrasion resistance, fuel economy and processability in a balanced manner. Also provided is a method for producing the rubber composition, and a pneumatic tire formed from the rubber composition. The rubber composition for a tire is obtained by mixing a kneaded mixture containing butadiene rubber 1, silica 1, a silane coupling agent 1 with a sulfur content of 20% by mass or more, and oil 1; styrene-butadiene rubber 2; and a silane coupling agent 2 with a sulfur content of less than 20% by mass.

8 Claims, No Drawings

RUBBER COMPOSITION FOR TIRE, AND PNEUMATIC TIRE

TECHNICAL FIELD

The present invention relates to a rubber composition for a tire, a method for producing the rubber composition, and a pneumatic tire formed from the rubber composition.

BACKGROUND ART

From the viewpoints of resources and energy saving and environmental protection, social needs for reduction in carbon dioxide gas emission have been increasing in recent years. For automobiles, various measures such as weight saving and use of electric energy have also been considered. Thus, tires for automobiles are needed to improve in properties such as abrasion resistance and durability to contribute to resources saving. Therefore, various improvements to rubber compositions for tires have been considered.

For example, a known technique to improve properties including abrasion resistance is to reduce the sulfur content in a rubber composition for a tire, but this leads to the problem of deterioration of fuel economy. Another proposed technique is to prepare a masterbatch to enhance the dispersibility of silica. However, this poses problems in that, for example, a masterbatch containing butadiene rubber and silica is poor in texture so that the masterbatch is difficult to feed in the form of a sheet, and therefore has lower processability. As described above, since the properties including abrasion resistance, fuel economy, and processability are generally difficult to improve in a balanced manner, improvements thereof are needed.

SUMMARY OF INVENTION

Technical Problem

The present invention aims to solve the above problems, thereby providing a rubber composition for a tire having improved abrasion resistance, fuel economy, and processability in a balanced manner. The present invention also aims to provide a method for producing the rubber composition, and a pneumatic tire formed from the rubber composition.

Solution to Problem

The present invention relates to a rubber composition for a tire, obtained by mixing:

a kneaded mixture containing butadiene rubber 1, silica 1, a silane coupling agent 1 with a sulfur content of 20% by mass or more, and oil 1;

styrene-butadiene rubber 2; and a silane coupling agent 2 with a sulfur content of less than 20% by mass.

Preferably, a combined amount of butadiene rubber and styrene-butadiene rubber is 80 to 100% by mass, and an amount of natural rubber is 0 to 20% by mass, each based on 100% by mass of total rubber components in the rubber composition, and an amount of silica is 20 to 150 parts by mass per 100 parts by mass of the total rubber components.

It is preferable that an amount (A) of a rubber component 1, an amount (B) of filler 1, an amount (C) of the silica 1, and an amount (D) of the oil 1 in the kneaded mixture satisfy the following formulas (I) and (II):

$$[D/(A+B+C+D)] \times 100 \geq 15 \qquad (I), and$$

$$30 \leq [C/(A+B+C+D)] \times 100 \leq 45 \qquad (II).$$

The present invention relates to a method for producing the rubber composition for a tire, including: a step 1 of preparing the kneaded mixture containing the butadiene rubber 1, the silica 1, the silane coupling agent 1, and the oil 1; and a step 2 of mixing the kneaded mixture, the styrene-butadiene rubber 2, and the silane coupling agent 2.

The present invention also relates to a pneumatic tire, formed from the rubber composition.

Advantageous Effects of Invention

The rubber composition for a tire of the present invention is obtained by mixing a kneaded mixture containing butadiene rubber, silica, a silane coupling agent with a high sulfur content, and oil; styrene-butadiene rubber; and a silane coupling agent with a low sulfur content. Thus, the present invention enables the kneaded mixture to have a good texture, and at the same time enables a rubber composition prepared therefrom to have improved abrasion resistance, fuel economy, and processability in a balanced manner.

DESCRIPTION OF EMBODIMENTS

The rubber composition for a tire of the present invention is obtained by mixing a kneaded mixture containing butadiene rubber 1, silica 1, a silane coupling agent 1 with a sulfur content of 20% by mass or more, and oil 1; styrene-butadiene rubber 2; and a silane coupling agent 2 with a sulfur content of less than 20% by mass.

A masterbatch containing butadiene rubber, silica, and a silane coupling agent is low in processability in that, for example, it is difficult to form into a sheet due to the properties of butadiene rubber, and thus the resulting compound has a poor texture. It is also difficult to incorporate a large amount of such a masterbatch due to poor compatibility with silica. Further, adding a silane coupling agent with a high sulfur content, although it improves fuel economy, reduces elongation at break. Also, reducing the amount of sulfur vulcanizing agent to increase the relative proportion of vulcanization accelerator, although it improves abrasion resistance and heat aging resistance, decreases fuel economy.

In contrast, in the preparation of the rubber composition of the present invention, since a kneaded mixture (masterbatch) containing butadiene rubber, silica, a silane coupling agent with a high sulfur content, and oil is prepared beforehand, the resulting masterbatch has a good texture and thus excellent processability. Further, a silane coupling agent with a high sulfur content is mixed in the preparation of the kneaded mixture, and a silane coupling agent with a low sulfur content is mixed in the mixing of styrene-butadiene rubber, which enables the rubber composition to have improved abrasion resistance, fuel economy, and processability. Therefore, the present invention enables to prepare a masterbatch excellent in processability, and at the same time provide a rubber composition prepared therefrom which has a remarkably improved property balance between abrasion resistance, fuel economy, and processability.

The rubber composition of the present invention may be suitably obtained, for example, by a production method including a step 1 of preparing the kneaded mixture containing the butadiene rubber 1, the silica 1, the silane coupling agent 1 with a sulfur content of 20% by mass or more, and the oil 1; and a step 2 of mixing the kneaded mixture obtained in the step 1, the styrene-butadiene rubber 2, and the silane coupling agent 2 with a sulfur content of less than 20% by mass.

(Step 1)

In the step 1, the kneaded mixture (masterbatch) containing the butadiene rubber 1, the silica 1, the silane coupling agent 1 with a sulfur content of 20% by mass or more, and the oil 1 is prepared.

The butadiene rubber 1 (BR 1) added in the step 1 is not particularly limited, and may be one generally used in the tire industry. Examples thereof include BRs with a high cis content such as BR 1220 (produced by Zeon Corporation), BR 150B (produced by Ube Industries, Ltd.), and BR 730 (produced by JSR) In particular, BRs having a cis content of 95% by mass or more are preferred because of their excellent properties such as excellent abrasion resistance.

The rubber component 1 added in the step 1 may appropriately include rubbers other than BR 1 as long as they do not impair the effects of the present invention. Examples of such rubbers include natural rubber (NR), isoprene rubber (IR), styrene-butadiene rubber (SBR), styrene-isoprene rubber (SIR), styrene-isoprene-butadiene rubber (SIBR), ethylene-propylene-diene rubber (EPDM), chloroprene rubber (CR), acrylonitrile-butadiene rubber (NBR), and butyl rubber (IIR).

Examples of the silica 1 added in the step 1 include dry silica (anhydrous silicic acid) and wet silica (hydrous silicic acid). Wet silica is preferred because such silica contains a large number of silanol groups. These silicas may be used alone or in combinations of two or more.

The silica 1 preferably has a nitrogen adsorption specific surface area ($N_2SA$) of 30 $m^2/g$ or greater, more preferably 100 $m^2/g$ or greater, whereas the $N_2SA$ is preferably 300 $m^2/g$ or smaller, and more preferably 280 $m^2/g$ or smaller. The silica 1 having an $N_2SA$ within a range as mentioned above allows the rubber composition to achieve fuel economy and processability in a balanced manner. The $N_2SA$ value of silica is measured by the BET method in accordance with ASTM D 3037-81.

The amount of the silica 1 in the step 1 per 100 parts by mass of the rubber component 1 of the kneaded mixture is preferably 20 parts by mass or more, and more preferably 50 parts by mass or more. The silica 1 in an amount of less than 20 parts by mass may result in insufficient fuel economy. The amount thereof is preferably 150 parts by mass or less, and more preferably 110 parts by mass or less. The silica 1 in an amount of more than 150 parts by mass is difficult to uniformly disperse, which may deteriorate processability. In addition, such an amount may also increase rolling resistance.

The silane coupling agent 1 added in the step 1 is not particularly limited as long as it has a sulfur content of 20% by mass or more. Examples thereof include sulfide silane coupling agents, mercapto silane coupling agents, vinyl silane coupling agents, amino silane coupling agents, glycidoxysilane coupling agents, nitro silane coupling agents, and chloro silane coupling agents, each having the predetermined sulfur content. Among these, sulfide silane coupling agents are preferred in terms of achieving the effects of the present invention sufficiently.

Specific examples thereof include bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-trimethoxysilylpropyl)trisulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, and 3-triethoxysilylpropylbenzothiazole tetrasulfide. These may be used alone or in combinations of two or more.

The amount of the silane coupling agent 1 in the step 1 per 100 parts by mass of the silica 1 in the kneaded mixture is preferably 4 parts by mass or more, and more preferably 5 parts by mass or more. The silane coupling agent 1 in an amount of less than 4 parts by mass tends to produce an insufficient effect, resulting in a decrease in abrasion resistance. The amount thereof is preferably 14 parts by mass or less, and more preferably 12 parts by mass or less. The silane coupling agent 1 in an amount of more than 14 parts by mass tends to produce less effect than expected from the increase in the cost and rather tends to reduce reinforcement and abrasion resistance.

The filler 1 added in the step 1 may include fillers other than the silica 1. Examples thereof include those known in the tire industry such as carbon black, aluminum hydroxide, clay, calcium carbonate, montmorillonite, cellulose, glass balloons, and various short fibers.

The amount of the filler 1 in the step 1 per 100 parts by mass of the rubber component 1 of the kneaded mixture is preferably 20 parts by mass or more, and more preferably 50 parts by mass or more. The filler 1 in an amount of less than 20 parts by mass may result in insufficient reinforcement. The amount thereof is preferably 150 parts by mass or less, and more preferably 110 parts by mass or less. The filler 1 in an amount of more than 150 parts by mass may result in insufficient fuel economy and processability.

The oil 1 added in the step 1 is not particularly limited, and examples thereof include process oils such as paraffinic process oils, naphthenic process oils, and aromatic process oils (aromatic oils).

The amount of the oil 1 in the step 1 per 100 parts by mass of the rubber component 1 of the kneaded mixture is preferably 10 parts by mass or more, and more preferably 30 parts by mass or more. The oil 1 in an amount of less than 10 parts by mass may result in reduced processability. The amount thereof is preferably 100 parts by mass or less, and more preferably 50 parts by mass or less. The oil 1 in an amount of more than 100 parts by mass may decrease abrasion resistance.

In the kneaded mixture prepared in the step 1, it is preferable that the amount (A) of the rubber component 1, the amount (B) of the filler 1, the amount (C) of the silica 1, and the amount (D) of the oil 1 in the kneaded mixture satisfy formulas (I) and (II) below. This enables to remarkably achieve the aforementioned effects, i.e., preparing a masterbatch excellent in processability, and at the same time providing an improved property balance between abrasion resistance, fuel economy, and processability.

$$[D/(A+B+C+D)] \times 100 \geq 15 \quad \text{(I), and}$$

$$30 \leq [C/(A+B+C+D)] \times 100 \leq 45 \quad \text{(II)}.$$

The ratio of the amount of the oil 1, which is defined by the formula (I), is more preferably $15 \leq [D/(A+B+C+D)] \times 100 \leq 18$, and still more preferably $15 \leq [D/(A+B+C+D)] \times$ 100≤17. The ratio of less than 15 may not ensure sufficient processability, whereas the ratio of more than 18 may cause excessive adhesion.

The ratio of the amount of the silica 1, which is defined by the formula (II), is more preferably 32≤[C/(A+B+C+D)]×100≤43. If the ratio is less than 30, the amount of silica used in the step 1 may be small, which may not allow the effects of the present invention to be sufficiently achieved. If the ratio is more than 45, the amount of silica used in the step 1 may be too large to disperse sufficiently.

In the step 1, additives generally used in rubber compositions may be incorporated in addition to the rubber component 1 including BR 1, the filler 1 including the silica 1, the silane coupling agent 1, and the oil 1 as long as they do not impair the effects of the present invention.

(Step 2)

In the step 2, the kneaded mixture (masterbatch) prepared in the step 1, the styrene-butadiene rubber 2, and the silane coupling agent 2 with a sulfur content of 20% by mass or less are mixed.

The styrene-butadiene rubber 2 (SBR 2) added in the step 2 is not particularly limited. Examples thereof include emulsion-polymerized SBR (E-SBR) and solution-polymerized SBR (S-SBR). In particular, the SBR is suitably one modified with a modifier (modified SBR) in terms of providing good properties such as good fuel economy.

The modified SER may be obtained by treating SBR generally used in the tire industry with a modifier. Examples of the modifier include 3-aminopropyldimethylmethoxysilane, 3-aminopropylmethyldimethoxysilane, 3-aminopropylethyldimethoxysilane, 3-aminopropyltrimethoxysilane, 3-(2-aminoethylamino)propyltrimethoxysilane, tin tetrachloride, butyltin trichloride, and N-methylpyrrolidone. These may be used alone or in combinations of two or more. Among these, N-methylpyrrolidone is preferred in terms of achieving the effects of the present invention in a favorable manner.

The method for modifying SBR with the modifier may be a conventionally known method such as those described in JP H06-53768 B, JP H06-57767 B, and JP 2003-514078 T (which are incorporated by reference in their entirety). For example, bringing SBR into contact with a modifier is enough, and examples of such methods include a method in which SBR is synthesized by anion polymerization, then the polymerized rubber solution is combined with a predetermined amount of a modifier, and the polymerizing end (active end) of the SBR is reacted with the modifier, and a method of adding a modifier to an SBR solution to cause a reaction therebetween.

The rubber component 2 added in the step 2 may appropriately include rubbers other than SBR 2 as long as they do not impair the effects of the present invention. Examples thereof include various rubbers as mentioned above, such as butadiene rubber.

In the step 2, it is preferable to add silica 2. Examples of the silica 2 include silicas as mentioned for the silica 1. The silica 2 preferably has a similar nitrogen adsorption specific surface area ($N_2SA$) as mentioned for the silica 1.

The amount of the silica 2 in the step 2 per 100 parts by mass of the rubber component 2 added in the step 2 is preferably 20 parts by mass or more, and more preferably 50 parts by mass or more. Less than 20 parts by mass of the silica 2 may result in insufficient fuel economy. The amount thereof is preferably 150 parts by mass or less, and more preferably 110 parts by mass or less. The silica 2 in an amount of more than 150 parts by mass is difficult to uniformly disperse, which may deteriorate processability. In addition, such an amount may also increase rolling resistance.

The silane coupling agent 2 added in the step 2 is not particularly limited as long as it has a sulfur content of less than 20% by mass. Examples thereof include sulfide silane coupling agents, mercapto silane coupling agents, vinyl silane coupling agents, amino silane coupling agents, glycidoxy silane coupling agents, nitro silane coupling agents, and chloro silane coupling agents, each having the predetermined sulfur content. Among these, sulfide silane coupling agents are preferred in terms of achieving the effects of the present invention sufficiently.

Specific examples thereof include bis(3-triethoxysilylpropyl)disulfide, bis(3-triethoxysilylpropyl)trisulfide, bis(3-trimethoxysilylpropyl)disulfide, 3-triethoxysilylpropyl methacrylate monosulfide, 3-trimethoxysilylpropyl methacrylate monosulfide. These may be used alone or in combinations of two or more.

The amount of the silane coupling agent 2 in the step 2 per 100 parts by mass of the silica 2 added in the step 2 is preferably 4 parts by mass or more, and more preferably 5 parts by mass or more. The silane coupling agent 2 in an amount of less than 4 parts by mass tends to produce an insufficient effect, resulting in a decrease in abrasion resistance. The amount thereof is preferably 14 parts by mass or less, and more preferably 12 parts by mass or less. The silane coupling agent 2 in an amount of more than 14 parts by mass tends to produce less effect than expected from the increase in the cost and rather tends to reduce reinforcement and abrasion resistance.

The filler 2 added in the step 2 may include fillers other than the silica 2. Examples thereof include those mentioned for the filler 1. Oil 2 may also be added in the step 2. Examples thereof include those mentioned for the oil 1. The amount of the filler 2 per 100 parts by mass of the rubber component 2 added in the step 2 is preferably the same as the amount relative to the rubber component 1 of the kneaded mixture in the step 1, and the amount of the oil 2 per 100 parts by mass of the rubber component 2 added in the step 2 is preferably the same as the amount relative to the rubber component 1 of the kneaded mixture in the step 1.

In the step 2, additives generally used in rubber compositions may be incorporated together with the rubber component 2 including SBR 2, the filler 2 including the silica 2, the silane coupling agent 2, and the oil 2 as long as they do not impair the effects of the present invention.

The kneaded mixture (masterbatch) in the step 1 can be prepared by mixing the rubber component 1 including BR 1, the filler 1 including the silica 1, the silane coupling agent 1, the oil 1, and other optional components by a kneading machine generally used in the rubber industry, such as a Banbury mixer or an open roll mill. The mixing in the step 2 can be carried out by mixing the rubber component 2 including SBR 2, the filler 2 such as the silica 2, the silane coupling agent 2, the oil 2, and other optional components by the above kneading machine.

The mixing temperature in the steps 1 and 2 is preferably 80° C. to 200° C., and more preferably 100° C. to 160° C. The mixing time is not particularly limited, and is usually 30 seconds or longer, preferably 1 to 30 minutes.

(Step 3)

After the mixing in the step 2, a final mixing is usually performed, for example, by mixing the kneaded mixture obtained in the step 2, a vulcanizing agent such as sulfur, and a vulcanization accelerator at a temperature of 70° C. to 85° C. for 2 to 4 minutes, followed by vulcanization, thereby providing a vulcanized rubber composition of the present invention (final mixing and vulcanization). With respect to the mixing in the steps 1 to 3, the number of mixing stages is not particularly limited, and may be one, two or more (additional mixing, divided addition of additives, etc.).

In the rubber composition of the present invention obtained, for example, by the above production method, the combined amount of butadiene rubber and styrene-butadiene rubber based on 100% by mass of the rubber components in the rubber composition (the total rubber components in the rubber composition, hereinafter the same applies) is preferably 80% by mass or more, and more preferably 90% by mass or more, and may be 100% by mass. If the combined amount is less than 80% by mass, the properties such as fuel economy and abrasion resistance tend to be reduced, failing to provide the effects of the present invention sufficiently.

In the rubber composition of the present invention obtained, for example, by the above production method, the amount of butadiene rubber based on 100% by mass of the total rubber components is preferably 10% by mass or more, and more preferably 20% by mass or more. Less than 10% by mass of butadiene rubber may result in insufficient fuel economy and abrasion resistance. The amount thereof is preferably 70% by mass or less, and more preferably 50% by mass or less. More than 70% by mass of butadiene rubber may result in insufficient processability.

Preferably, 70% by mass or more, more preferably 80% by mass or more, of the total butadiene rubber (100% by mass) in the rubber composition of the present invention may suitably be incorporated as BR 1 in the kneaded mixture prepared in the step 1. Further, 100% by mass of the total butadiene rubber may be incorporated in the step 1. Such procedures ensure some properties such as processability, and also enable silica to sufficiently disperse in BR 1.

In the rubber composition of the present invention obtained, for example, by the above production method, the amount of styrene-butadiene rubber based on 100% by mass of the total rubber components is preferably 20% by mass or more, and more preferably 40% by mass or more. Less than 20% by mass of styrene-butadiene rubber may result in insufficient fuel economy. The amount thereof is preferably 90% by mass or less, and more preferably 70% by mass or less. More than 90% by mass of styrene-butadiene rubber tends to result in a decrease in abrasion resistance.

Preferably, 70% by mass or more, more preferably 80% by mass or more, of the total styrene-butadiene rubber (100% by mass) in the rubber composition of the present invention may suitably be incorporated as SBR 2 during the mixing in the step 2. Further, 100% by mass of the total styrene-butadiene rubber may be incorporated in the step 2. Such procedures enable silica to sufficiently disperse in SBR 2.

In the rubber composition of the present invention obtained, for example, by the above production method, the amount of NR based on 100% by mass of the total rubber components is preferably 20% by mass or less, and more preferably 10% by mass or less. The rubber composition may be free of NR. If the amount of NR is more than 20% by mass, the effects of the present invention may be insufficient.

In the rubber composition of the present invention obtained, for example, by the above production method, the total amount of silica per 100 parts by mass of the total rubber components is preferably 20 parts by mass or more, and more preferably 50 parts by mass or more. If the total amount is less than 20 parts by mass, the fuel economy may be insufficient. The total amount thereof is preferably 150 parts by mass or less, and more preferably 110 parts by mass or less. More than 150 parts by mass of silica is difficult to uniformly disperse, which may deteriorated processability. In addition, such an amount may also increase rolling resistance.

In the rubber composition of the present invention obtained, for example, by the above production method, the total amount of silane coupling agent per 100 parts by mass of silica is preferably 4 parts by mass or more, and more preferably 5 parts by mass or more. The silane coupling agent in a total amount of less than 4 parts by mass tends to produce an insufficient effect, resulting in a decrease in abrasion resistance. The total amount thereof is preferably 14 parts by mass or less, and more preferably 12 parts by mass or less. If the total amount is more than 14 parts by mass, the silane coupling agent tends to produce less effect than expected from the increase in the cost and rather tends to reduce reinforcement and abrasion resistance.

Preferably, 70% by mass or more, more preferably 80% by mass or more, of the total silane coupling agent (100% by mass) with a sulfur content of 20% by mass or more in the rubber composition of the present invention may suitably be incorporated as the silane coupling agent 1 in the kneaded mixture prepared in the step 1. Also preferably, 70% by mass or more, more preferably 80% by mass or more, of the total silane coupling agent (100% by mass) with a sulfur content of less than 20% by mass in the rubber composition may suitably be incorporated as the silane coupling agent 2 during the mixing in the step 2. Further, 100% by mass of the total silane coupling agent 1 or 2 may be incorporated in the corresponding step. Such procedures enable silica to sufficiently disperse in BR 1 or SBR 2.

In the rubber composition of the present invention obtained, for example, by the above production method, the total amount of oil per 100 parts by mass of the total rubber components is preferably 10 parts by mass or more, and more preferably 30 parts by mass or more. Less than 10 parts by mass of oil may result in a decrease in processability. The total amount thereof is preferably 100 parts by mass or less, and more preferably 50 parts by mass or less. More than 100 parts by mass of oil may decrease abrasion resistance.

The rubber composition of the present invention preferably contains carbon black which may, for example, be appropriately added in the step 1 and/or the step 2. Specifically, the carbon black may be one generally used in the tire industry, such as GPF, FEF, HAF, ISAF, and SAF.

The nitrogen adsorption specific surface area ($N_2SA$) of carbon black is preferably 50 to 180 $m^2/g$, and more preferably 120 to 150 $m^2/g$. The dibutyl phthalate (DBP) oil absorption of carbon black is preferably 80 to 180 ml/100 g, and more preferably 110 to 140 ml/100 g. If each of these properties is less than the lower limit, the reinforcement may be insufficient. If each of these properties exceeds the upper limit, the processability tends to be deteriorated. The $N_2SA$ and the DBP oil absorption of carbon black are determined in conformity with JIS K 6217-2:2001 and JIS K 6217-4: 2001, respectively.

In the rubber composition of the present invention obtained, for example, by the above production method, the amount of carbon black per 100 parts by mass of the total rubber components is preferably 0.5 parts mass or more, and more preferably 1 part by mass or more. Less than 0.5 parts by mass of carbon black may result in insufficient reinforcement and weather resistance. The amount thereof is preferably 20 parts mass or less, and more preferably 10 parts by mass or less. More than 20 parts by mass of carbon black tends to deteriorate fuel economy.

In the rubber composition of the present invention obtained, for example, by the above production method, the silica content based on 100% by mass of the total filler (preferably the combined amount of silica and carbon black) is preferably 50% by mass or more, more preferably 60% by mass or more, and still more preferably 80% by mass or more. With a silica content as mentioned above, the effects of the present invention can be more suitably achieved.

The rubber composition of the present invention may optionally contain, in addition to the components mentioned above, additives generally used in the tire industry, such as stearic acid, zinc oxide, an antioxidant, a lubricant, wax, a vulcanizing agent, and a vulcanization accelerator. Stearic acid, zinc oxide, an antioxidant, a plasticizer, a lubricant, and wax may be mixed in any step, and are preferably mixed dividedly in the steps 1 and 2. A vulcanizing agent and a vulcanization accelerator are typically mixed in the final mixing.

Examples of the vulcanizing agent include sulfur such as sulfur powder, precipitated sulfur, colloidal sulfur, surface-treated sulfur, and insoluble sulfur. In the rubber composition of the present invention, the amount of sulfur per 100 parts by mass of the total rubber components is preferably 0.1 to 4.0 parts by mass, and more preferably 0.3 to 3.0 parts by mass.

Examples of the vulcanization accelerator include sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine or aldehyde-ammonia vulcanization accelerators, imidazoline vulcanization accelerators, and xanthate vulcanization accelerators. Among these, sulfenamide vulcanization accelerators and guanidine vulcanization accelerators are preferred because of their excellent vulcanization properties.

Examples of sulfenamide vulcanization accelerators include CBS (N-cyclohexyl-2-benzothiazylsulfenamide), TBBS (N-t-butyl-2-benzothiazole sulfenamide), and N,N-dicyclohexyl-2-benzothiazylsulfenamide. Examples of guanidine vulcanization accelerators include diphenylguanidine (DPG). In the rubber composition of the present invention, the amount of vulcanization accelerator per 100 parts by mass of the total rubber components is preferably 1.0 to 6.0 parts by mass, and more preferably 1.5 to 5.0 parts by mass.

The rubber composition of the present invention is applicable to various tire components, and can be particularly suitably used for treads.

The pneumatic tire of the present invention can be prepared using the rubber composition by an ordinary method. Specifically, an unvulcanized rubber composition containing additives as appropriate is extruded into the shape of a tire component, and then molded in an ordinary manner in a tire building machine to form an unvulcanized tire, which is then heated and pressurized in a vulcanizer, thereby providing a pneumatic tire.

The pneumatic tire of the present invention is applicable to any tires, and can be particularly suitably used as tires for passenger vehicles.

EXAMPLES

The present invention is more specifically described with reference to examples, although the present invention is not limited to the examples.

In the following, the chemical agents used in Preparation of masterbatch, or in examples and comparative examples are listed.

SBR: NS116R (modified S-SBR modified at one end with N-methylpyrrolidone, styrene content: 22% by mass, vinyl bond content: 65% by mass), produced by Zeon Corporation BR: BR730, produced by JSR Corporation Silica: ULTRASIL VN3 ($N_2SA$: 175 $m^2/g$), produced by Degussa Carbon black: N220 ($N_2SA$: 143 $m^2/g$, DBP oil absorption: 113 ml/100 g), produced by Cabot Japan K.K.

Silane coupling agent 1: Si69 (bis(3-triethoxysilylpropyl)tetrasulfide, sulfur content: 22.5% by mass), produced by EVONIK DEGUSSA Silane coupling agent 2: Si266 (bis(3-triethoxysilylpropyl)disulfide, sulfur content: 14.4% by mass), produced by EVONIK DEGUSSA Oil: X-140, produced by Japan Energy Corporation Antioxidant: NOCRAC 6C (N-(1,3-dimethylbutyl)-N'-phenyl-p-phenylenediamine), produced by OUCHI SHINKO CHEMICAL INDUSTRIAL CO., LTD.

Stearic acid: Stearic Acid "Tsubaki", produced by NOF CORP.

Zinc oxide: Zinc oxide #1, produced by MITSUI MINING & SMELTING CO., LTD.

Wax: Sunnoc N, produced by OUCHI SHINKO CHEMICAL INDUSTRIAL CO., LTD.

Sulfur: sulfur powder (sulfur content: 100%), produced by Tsurumi Chemical Industry Co., Ltd.

Vulcanization accelerator 1: Sanceler NS, produced by SANSHIN CHEMICAL INDUSTRY CO., LTD.

Vulcanization accelerator 2: Sanceler D-G, produced by SANSHIN CHEMICAL INDUSTRY CO., LTD.

Examples and Comparative Examples (Preparation of Masterbatch (Step 1))

According to the recipes shown in Table 1, kneaded mixtures (masterbatches 1 to 5) were prepared by mixing at 145° C. for 5 minutes using a 1.7-L Banbury mixer (produced by KOBE STEEL, LTD.).

The prepared masterbatches 1 to 5 were evaluated for processability (by visual observation) as follows. The results are shown in Table 1.

(Processability (by Visual Observation))

The texture of the prepared masterbatches was scored by visual observation. Scoring is on a scale from 1 to 5. A larger number indicates better texture conditions. A score of 3 indicates the minimum practicable level.

TABLE 1

Step 1: Preparation of masterbatch (rubber component: 100 parts by mass)

| | | Masterbatch (MB) | | | | |
|---|---|---|---|---|---|---|
| | | 1 | 2 | 3 | 4 | 5 |
| Ingredients (parts by mass) | SBR | — | — | — | 15 | — |
| | BR | 100 | 100 | 100 | 85 | 100 |
| | Silica | 80 | 80 | 100 | 80 | 65 |
| | Carbon black | 3 | 3 | 3 | 3 | 3 |
| | Silane coupling agent 1 (sulfur content: 22.5%) | — | 6.4 | 8.0 | 6.4 | 5.2 |
| | Silane coupling agent 2 (sulfur content: 14.4%) | 6.4 | — | — | — | — |
| | Oil | 37.5 | 37.5 | 37.5 | 37.5 | 32.0 |
| | Antioxidant | 2 | 2 | 2 | 2 | 2 |
| | Stearic acid | 2 | 2 | 2 | 2 | 2 |
| | Zinc oxide | 2 | 2 | 2 | 2 | 2 |
| | Wax | 2 | 2 | 2 | 2 | 2 |
| Total amount (parts by mass) | | 234.9 | 234.9 | 256.5 | 234.9 | 213.2 |
| Ratio of the amount of oil: D/(A + B + C + D) | | 17.0 | 17.0 | 15.6 | 17.0 | 16.0 |
| 15 or more | | ○ | ○ | ○ | ○ | ○ |
| Raito of the amount of silica: C/(A + B + C + D) | | 36.3 | 36.3 | 41.6 | 36.3 | 32.5 |
| 30 to 45 | | ○ | ○ | ○ | ○ | ○ |
| Evaluation | Processability (by visual observation) | 4 | 4 | 3 | 4 | 3 |

(Preparation of Rubber Composition (Steps 2 and 3))

According to the recipes for the step 1 (MB) and the step 2 shown in Table 2, ingredients were mixed at 150° C. for 5 minutes with the masterbatch 1 to 5 prepared in the step 1, to prepare a kneaded mixture. Then, sulfur and vulcanization accelerators were added to the obtained kneaded mixture according to the recipe for the step 3, and they were kneaded at 80° C. for 3 minutes by an open roll mill, whereby an unvulcanized rubber composition was obtained.

The obtained unvulcanized rubber composition was press-vulcanized at 170° C. for 20 minutes, thereby providing a vulcanized rubber composition.

The thus obtained unvulcanized rubber compositions and vulcanized rubber compositions were evaluated as follows. The results are shown in Table 2.

(Processability (Mooney Viscosity))

The Mooney viscosity of the obtained unvulcanized rubber composition was measured at 130° C. in accordance with JIS K 6300. The measured value is expressed as an index (index of Mooney viscosity) according to the following formula when the Mooney viscosity ($ML_{1+4}$) value in Comparative Example 1 is taken as 100. A greater index indicates lower Mooney viscosity and better processability.

(Index of Mooney Viscosity)

=($ML_{1+4}$ in Comparative Example 1)/($ML_{1+4}$ in each example)×100

(Abrasion Resistance)

The abrasion loss of the obtained vulcanized rubber composition was measured using a Lambourn abrasion tester at a room temperature, an applied load of 1.0 kgf, and a slip ratio of 30%. The inverse of the measured value is expressed as an index when the inverse of the abrasion loss value in Comparative Example 1 is taken as 100. A greater index indicates higher abrasion resistance.

(Fuel Economy)

A sample with a predetermined size was cut out of the obtained vulcanized rubber composition. Then, the loss tangent (tan δ) of the vulcanized rubber sheet was measured at an initial strain of 10%, a dynamic strain of 2%, a frequency of 10 Hz, and a temperature of 60° C. using a viscoelasticity spectrometer produced by Ueshima Seisakusho Co., Ltd. The measured value is expressed as an index (index of fuel economy) according to the following formula when the tan δ value in Comparative Example 1 is taken as 100. A greater index indicates better fuel economy.

(Index of Fuel Economy)

=(tan δ in Comparative Example 1)/(tan δ in each example)×100

TABLE 2

| | | | Comparative Examples | | | Examples | | | |
|---|---|---|---|---|---|---|---|---|---|
| | | | 1 | 2 | 3 | 1 | 2 | 3 | 4 |
| Ingredients (parts by mass) | MB prepared in step 1 and its composition (with 40 parts by mass of rubber component) | | MB1 | MB1 | MB2 | MB2 | MB3 | MB4 | MB5 |
| | Step 1 | SBR | — | — | — | — | — | 6 | — |
| | | BR | 40 | 40 | 40 | 40 | 40 | 34 | 40 |
| | | Silica | 32 | 32 | 32 | 32 | 40 | 32 | 26 |
| | | Carbon black | 1.2 | 1.2 | 1.2 | 1.2 | 1.2 | 1.2 | 1.2 |
| | | Silane coupling agent 1 (sulfur content: 22.5%) | — | — | 2.56 | 2.56 | 3.2 | 2.56 | 2.08 |
| | | Silane coupling agent 2 (sulfur content: 14.4%) | 2.56 | 2.56 | — | — | — | — | — |
| | | Oil | 15 | 15 | 15 | 15 | 15 | 15 | 12.8 |
| | | Antioxidant | 0.8 | 0.8 | 0.8 | 0.8 | 0.8 | 0.8 | 0.8 |

TABLE 2-continued

|  |  | Comparative Examples | | | Examples | | | |
| --- | --- | --- | --- | --- | --- | --- | --- | --- |
|  |  | 1 | 2 | 3 | 1 | 2 | 3 | 4 |
|  | Stearic acid | 0.8 | 0.8 | 0.8 | 0.8 | 0.8 | 0.8 | 0.8 |
|  | Zinc oxide | 0.8 | 0.8 | 0.8 | 0.8 | 0.8 | 0.8 | 0.8 |
|  | Wax | 0.8 | 0.8 | 0.8 | 0.8 | 0.8 | 0.8 | 0.8 |
| Total amount of MB prepared in step 1 |  | 93.96 | 93.96 | 93.96 | 93.96 | 102.6 | 93.96 | 85.28 |
| Step 2 | SBR | 60 | 60 | 60 | 60 | 60 | 54 | 60 |
|  | BR | — | — | — | — | — | 6 | — |
|  | Silica | 48 | 48 | 48 | 48 | 40 | 48 | 54 |
|  | Carbon black | 1.8 | 1.8 | 1.8 | 1.8 | 1.8 | 1.8 | 1.8 |
|  | Silane coupling agent 1 (sulfur content: 22.5%) | 3.84 | — | 3.84 | — | — | — | — |
|  | Silane coupling agent 2 (sulfur content: 14.4%) | — | 3.84 | — | 3.84 | 3.2 | 3.84 | 4.32 |
|  | Oil | 22.5 | 22.5 | 22.5 | 22.5 | 22.5 | 22.5 | 24.2 |
|  | Antioxidant | 1.2 | 1.2 | 1.2 | 1.2 | 1.2 | 1.2 | 1.2 |
|  | Stearic acid | 1.2 | 1.2 | 1.2 | 1.2 | 1.2 | 1.2 | 1.2 |
|  | Zinc oxide | 1.2 | 1.2 | 1.2 | 1.2 | 1.2 | 1.2 | 1.2 |
|  | Wax | 1.2 | 1.2 | 1.2 | 1.2 | 1.2 | 1.2 | 1.2 |
| Step 3 | Sulfur | 1.5 | 1.5 | 1.5 | 1.5 | 1.5 | 1.5 | 1.5 |
|  | Vulcanization accelerator 1 | 1.7 | 1.7 | 1.7 | 1.7 | 1.7 | 1.7 | 1.7 |
|  | Vulcanization accelerator 2 | 2 | 2 | 2 | 2 | 2 | 2 | 2 |
| Total amount of all ingredients |  | 240.1 | 240.1 | 240.1 | 240.1 | 240.1 | 240.1 | 239.6 |
| Evaluation | Processability (Mooney viscosity) | 100 | 108 | 96 | 105 | 107 | 103 | 103 |
|  | Abrasion resistance | 100 | 98 | 113 | 119 | 122 | 113 | 115 |
|  | Fuel economy | 100 | 98 | 103 | 106 | 108 | 105 | 105 |

The results shows that, in the examples, masterbatches having a good texture were obtained, and at the same time, rubber compositions prepared therefrom had an excellent property balance between processability, fuel economy, and abrasion resistance.

The invention claimed is:

1. A method for producing a rubber composition for a tire, comprising:
    a step 1 of preparing a kneaded mixture containing a butadiene rubber 1, a silica 1, a sulfide silane coupling agent 1 having a sulfur content of 20% by mass or more, and an oil 1, wherein an amount of the silica 1 per 100 parts by mass of the butadiene rubber 1 of the kneaded mixture is 50 to 110 parts by mass, an amount of the sulfide silane coupling agent 1 per 100 parts by mass of the silica 1 in the kneaded mixture is 5 to 12 parts by mass, and an amount of the oil 1 per 100 parts by mass of the butadiene rubber 1 of the kneaded mixture is 10 to 50 parts by mass; and
    a step 2 of mixing the kneaded mixture, a styrene-butadiene rubber 2, a silica 2, and a sulfide silane coupling agent 2 having a sulfur content of less than 20% by mass, wherein an amount of the silica 2 per 100 parts by mass of the styrene-butadiene rubber 2 is 20 to 110 parts by mass and an amount of the sulfide silane coupling agent 2 per 100 parts by mass of the silica 2 is 5 to 12 parts by mass,
    wherein a mixing temperature in the step 1 is 100° C. to 200° C., a mixing temperature in the step 2 is 100° C. to 200° C., a mixing time in the step 1 is 1 to 30 minutes, and a mixing time in the step 2 is 1 to 30 minutes, and
    wherein the sulfide silane coupling agent 1 is bis(3-triethoxysilylpropyl)tetrasulfide, and the sulfide silane coupling agent 2 is bis(3-triethoxysilylpropyl)disulfide.

2. The method for producing the rubber composition for a tire according to claim 1,
    wherein the butadiene rubber 1 is butadiene rubber having a cis content of 95% by mass or more, and the styrene-butadiene rubber 2 is styrene-butadiene rubber modified at one end with N-methylpyrrolidone.

3. The method for producing the rubber composition for a tire according to claim 1,
    wherein the butadiene rubber 1 is butadiene rubber having a cis content of 95% by mass or more, and the styrene-butadiene rubber 2 is styrene-butadiene rubber modified at one end with N-methylpyrrolidone, and
    both the silica 1 and 2 have a nitrogen adsorption specific surface area of 100 to 280 m$^2$/g.

4. The method for producing the rubber composition for a tire according to claim 1,
    wherein the butadiene rubber 1 is butadiene rubber having a cis content of 95% by mass or more, and the styrene-butadiene rubber 2 is styrene-butadiene rubber modified at one end with N-methylpyrrolidone,
    both the silica 1 and 2 have a nitrogen adsorption specific surface area of 100 to 280 m$^2$/g, and
    the oil 1 is an aromatic process oil.

5. A method for producing a rubber composition for a tire, comprising:
    a step 1 of preparing a kneaded mixture containing a butadiene rubber 1, a silica 1, a sulfide silane coupling agent 1 having a sulfur content of 20% by mass or more, and an oil 1, wherein an amount of the silica 1 per 100 parts by mass of the butadiene rubber 1 of the kneaded mixture is 50 to 110 parts by mass, an amount of the sulfide silane coupling agent 1 per 100 parts by mass of the silica 1 in the kneaded mixture is 5 to 12 parts by mass, and an amount of the oil 1 per 100 parts by mass of the butadiene rubber 1 of the kneaded mixture is 10 to 50 parts by mass; and
    a step 2 of mixing the kneaded mixture, a styrene-butadiene rubber 2, a silica 2, and a sulfide silane coupling agent 2 having a sulfur content of less than 20% by mass, wherein an amount of the silica 2 per 100 parts by mass of the styrene-butadiene rubber 2 is 20 to 110 parts by mass and an amount of the sulfide silane coupling agent 2 per 100 parts by mass of the silica 2 is 5 to 12 parts by mass, wherein a mixing temperature in the step 1 is 130° C. to 190° C., a mixing temperature in the step 2 is 130° C. to 190° C., a mixing time in the step 1 is 1.5 to 10 minutes, and a mixing time in the step 2 is 1.5 to 10 minutes, and wherein the sulfide silane coupling agent 1 is bis(3-triethoxysilylpropyl)tetrasulfide, and the sulfide silane coupling agent 2 is bis(3-triethoxysilylpropyl)disulfide.

6. The method for producing the rubber composition for a tire according to claim 5, wherein the butadiene rubber 1 is butadiene rubber having a cis content of 95% by mass or more, and the styrene-butadiene rubber 2 is styrene-butadiene rubber modified at one end with N-methylpyrrolidone.

7. The method for producing the rubber composition for a tire according to claim 5, wherein the butadiene rubber 1 is butadiene rubber having a cis content of 95% by mass or more, and the styrene-butadiene rubber 2 is styrene-butadiene rubber modified at one end with N-methylpyrrolidone, and both the silica 1 and 2 have a nitrogen adsorption specific surface area of 100 to 280 $m^2/g$.

8. The method for producing the rubber composition for a tire according to claim 5, wherein the butadiene rubber 1 is butadiene rubber having a cis content of 95% by mass or more, and the styrene-butadiene rubber 2 is styrene-butadiene rubber modified at one end with N-methylpyrrolidone, both the silica 1 and 2 have a nitrogen adsorption specific surface area of 100 to 280 $m^2/g$, and the oil 1 is an aromatic process oil.

* * * * *